Sept. 10, 1974   J. F. CACHAT   3,834,895
METHOD OF RECLAIMING IRON FROM FERROUS DUST
Filed April 11, 1973

3,834,895
METHOD OF RECLAIMING IRON FROM FERROUS DUST

John F. Cachat, Cleveland, Ohio, assignor to Park-Ohio Industries, Inc., Cleveland, Ohio
Filed Apr. 11, 1973, Ser. No. 350,207
Int. Cl. C21c 5/52
U.S. Cl. 75—11        7 Claims

ABSTRACT OF THE DISCLOSURE

Iron bearing particulate waste material is introduced into a plasma-arc furnace and heated in the furnace to separate the iron from the particulate material and to melt the iron. The molten iron is collected in a trough in the bottom of the plasma-arc furnace and is discharged from the furnace directly into an ingot mold or steel making furnace.

---

Figure 1:
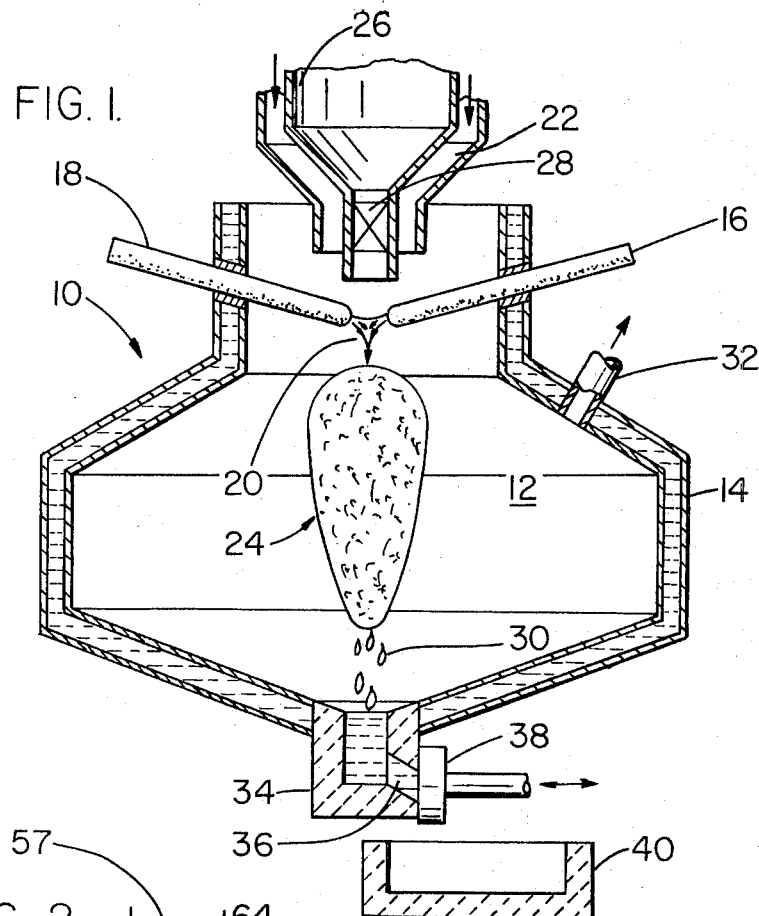

The present invention relates to the art of recovering iron from iron bearing particulate material and, more particularly, to a method of recovering iron from particulate material heretofore considered waste.

Plasma-arc torches and furnaces have been employed heretofore in the field of metallurgy for such purposes as melting metal and processing metal ores such as iron ore. Such furnaces and torches include electrodes for striking an arc, and an inert gas is flowed in an angular area around the arc and is raised to an extremely high temperature thereby. The high temperature causes the gas to become ionized and provide what is referred to as a plasma. If metal bearing particulate material is introduced into the resulting plasma flame, or is disposed in the vicinity thereof, the plasma heats the particulate material and melts the iron therein which then descends in droplet form toward the bottom of the furnace. Moreover, the inert gas protects the metal from oxidation, and constituents of the particulate material other than the iron are withdrawn from the furnace as exhaust gas.

Heretofore, melted iron droplets produced in the foregoing manner have been cooled and solidified during their descent to the bottom of the furnace to produce iron shot. The shot was suitably removed from the furnace and subsequently used either as shot, as powdered metal, or compacting the shot to provide a charge for steel making furnaces.

The present invention provides an improvement in the methods heretofore known, which improvement advantageously enables iron in iron bearing particulate waste materials to be recovered and immediately used. Accordingly, the time consuming and expensive step or steps and associated apparatus by which the recovered metal was heretofore formed into shot, collected and subsequently put to use are eliminated. More particularly, the present invention advantageously provides for eliminating the production of shot as well as the cost and problems attendant to the collection and storage thereof and the further treatment thereof such as by compacting before subsequent use of the recovered material. Therefore, a substantial reduction in the cost of recovering and using iron from particulate material is achieved in accordance with the present invention and, just as importantly, the method by which recovery and use are achieved can be practiced on site, such as at an ore mine or at a steel making location. In this respect, the present invention advantageously enables recovery and use of iron from particulate materials heretofore considered waste materials at such sites.

More particularly with regard to the present invention a plasma-arc torch device or furnace is provided at the site where iron bearing waste materials are available such as ferrous oxide and dust available as a by-product of a basic oxygen furnace unit, or magnetite in dust at an ore mining site. Such waste dust is introduced into the plasma-arc device, whereby the iron in the dust is heated and melted forming iron droplets. The droplets descend toward the bottom of the device while the constituents of the waste dust other than iron are exhausted from the device in a gas stream. The melted iron is not cooled and solidified in accordance with previous practices, but rather is maintained in the molten state and discharged from the device for immediate use. If the plasma-arc device is located at a mining site, for example, the molten iron can be discharged directly into ingot molds and solidified to provide ingots ready for shipment directly to the site of a steel making furnace. As another example, the plasma-arc device can be located at a steel making site and operated in conjunction with a steel making furnace to recover iron in the foregoing manner from iron bearing particulate material in the waste dust from such furnaces. If employed in this manner, the molten iron can be directly fed into the steel making furnace.

It will be appreciated, therefore, that the method of the present invention advantageously provides for immediate use of reclaimed iron at a site where iron bearing waste dust is available and thus eliminates the expense, time and problems attendant to forming, collecting and storing metal shot in accordance with prior practices.

An outstanding object of the present invention is the provision of a method of reclaiming and using iron in iron bearing waste dust.

Another object is the provision of an improved method of recovering and using iron in iron bearing waste dust at the location where such waste dust is produced and available.

A further object is the provision of an improved method of recovering and using iron in iron bearing waste material by melting iron in the waste material and immediately employing the iron in its molten state.

Another object is the provision of a method of reclaiming usable iron from iron bearing dust material at a mine site by melting the iron in the dust and introducing the molten iron into ingot molds.

Still another object is the provision of a method of recovering usable iron from waste dust of a steel making furnace at a steel making location by melting the iron in the waste dust and feeding the molten iron directly into an operating steel making furnace.

Still another object is the provision of an improved method of recovering and using iron in iron bearing waste particulate material which is more economical than the recovery and use method heretofore practiced.

Figure 2:
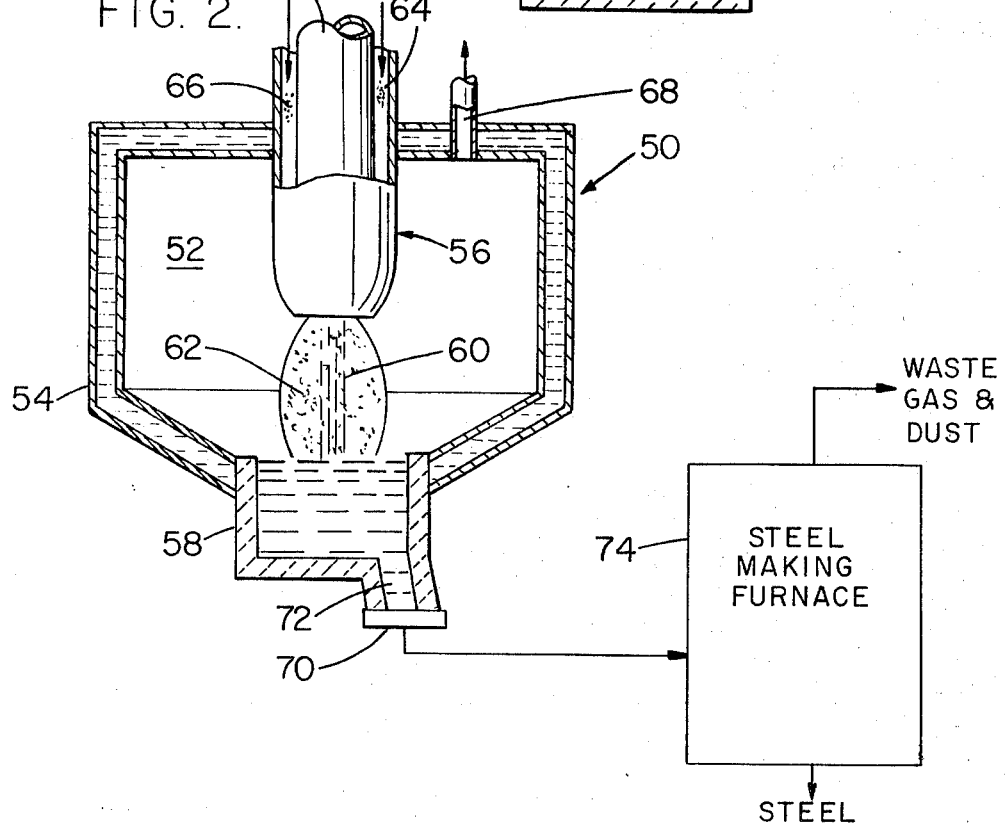

The foregoing objects, and others, will in part be obvious and in part pointed out more fully hereinafter in conjunction with the description of the accompanying drawing illustrating apparatus with which the method of the present invention can be practiced, and in which drawing:

FIG. 1 is an elevation view in section of a plasma-arc device for practicing the method of the present invention; and, FIG. 2 is an elevation view in section of another form of plasma-arc device for practicing the method of the present invention.

Referring now in greater detail to the drawing, a plasma-arc device 10 is illustrated in FIG. 1 of the drawing which includes a chamber 12 defined by a water cooled jacket or housing 14. A pair of electrodes 16 and 18 are provided adjacent the upper end of the housing and are relatively positioned to provide for the striking of an arc 20 therebetween. A suitable gas such as argon, helium, nitrogen, hydrogen or natural gas is introduced from a source, not illustrated, through an annular passageway 22 at the top of the chamber to flow in an annular path about arc 20. The gas is raised to a very high temperature, and the high temperature causes the gas to become ionized and form a plasma 24 as is well known.

Waste particulate material, bearing iron which is to be recovered, is introduced into chamber 12 for flow downwardly through the chamber in contact with plasma 24 and, in the apparatus illustrated, a suitable receptacle such as a hopper 26 serves to store and feed the particulate material into chamber 12 at the desired feed rate. Any suitable control device such as a flow control valve 28 may be employed in conjunction with the storage or feed receptacle to control the rate of flow of particulate material into chamber 12.

As the iron bearing dust material descends through plasma 24, the material is heated and the iron is melted by the high temperature gas. The melted iron descends to the bottom of chamber 12 in the form of droplets 30, and the remaining constituents of the particulate material are exhausted from chamber 12 as a gas through a suitable outlet or exhaust passage 32.

The bottom of chamber 12 is defined by a trough 34 of suitable refractory material having an outlet passage 36 adapted to be opened and closed in any suitable manner. For example, a refractory door member 38 displaceable relative to passage 36 could be provided for this purpose. Molten droplets 30 descend into trough 34 and preferably are allowed to do so until a quantity of molten iron has accumulated in the trough. The refractory material of the trough together with the heat in chamber 12 maintain the iron in the trough in a molten state. When a desired quantity of molten iron has accumulated in the trough, member 38 is displaced relative to passage 36 and the molten iron is discharged directly from the trough for use.

In FIG. 1 an ingot mold 40 is disposed adjacent to outlet passage 36, whereby the molten iron is immediately cast into an ingot. Such ingots can be used, for example, to charge a steel making furnace such as an open hearth or basic oxygen furnace. It will be appreciated that if the plasma-arc device is located at a mining site, waste iron bearing dust heretofore unused can be treated to recover the iron therein in the foregoing manner. The ingots would then be transferred to the steel making location for use without further processing thereof being necessary. It will be further appreciated that if the plasma-arc device is located at the steel making site, waste dust from the steel making furnaces can be processed in the above manner and the recovered molten iron fed directly into the steel making furnaces, as illustrated schematically in FIG. 2. This advantageously eliminates any intermediate step of solidifying or otherwise processing the recovered iron.

With reference now to FIG. 2, there is illustrated another form of apparatus by which the method of the present invention may be practiced. More particularly, a plasma-arc device 50 is illustrated which includes a chamber 52 defined by a water cooled jacket or housing 54. A plasma-arc torch assembly 56 extends into chamber 52 from the top of the device. The torch assembly is comprised of a constricted nozzle containing a cathode of tungsten or other similar material and is disposed in the chamber with the lower end of the nozzle directed toward a refractory trough 58 at the bottom of the chamber, which trough is adapted to contain molten iron. An arc 60 is struck with the molten iron in trough 58, whereby the molten iron defines the anode of the torch device, and gas is forced through the nozzle in an angular area surrounding the arc to produce the high temperature gas plasma 62.

Iron bearing particulate material 64 from which iron is to be recovered is introduced through the top of the chamber in any suitable manner and could, for example, be introduced by way of an annular passage 66 surrounding plasma-arc torch 57. The particulate material would thus flow in an annular path into plasma 62 wherein the iron would be heated and melted and would descend into the molten pool in trough 58. Other constituents of the particulate material are suitably removed from chamber 52 as an exhaust gas. Accordingly, an exhaust passage 68 is provided for this purpose. It will be appreciated that trough 58 is provided with a suitable closure 70 operable to open or close discharge passage 72 of the trough. As illustrated schematically, discharge passage 72 communicates directly with a steel making furnace 74, such as an open hearth furnace or a basic oxygen furnace, whereby the recovered molten iron can be introduced directly into the operating furnace. As mentioned above, the molten pool of iron in trough 58 serves as the anode, and the iron is maintained molten by the arc, the heat in chamber 52 and the insulating properties of the refractory material of the trough.

It will be appreciated that the apparatus illustrated and described herein is merely representative of plasma-arc devices by which the method of the present invention may be practiced. Other devices by which a high temperature gas plasma is produced can readily be used, it only being necessary to provide for the gas temperature to be sufficiently high to melt the iron from the waste dust and to provide for the melted iron to be maintained in a molten condition for discharge from the device in the molten state. Upon reading and understanding the foregoing description and the end results achieved, many suitable devices, as well as modifications of the devices illustrated herein, will be apparent to those skilled in the art as being adapted to being employed in conjunction with the practice of the method of the present invention. Accordingly, it is to be distinctly understood that the foregoing descriptive matter is to be interpreted merely as illustrative of the principles of the present invention and not as a limitation.

Having thus described my invention, I claim:

1. In a method of recovering iron from iron bearing material, comprising the steps of: providing a chamber having an inlet for iron bearing particulate material to be treated and an outlet for iron recovered from said particulate material, establishing a plasma-arc in said chamber, introducing said particulate material through said inlet, and heating said particulate material by said plasma-arc to melt the iron in said particulate material, the improvement comprising: collecting a pool of said molten iron in said chamber, and discharging said collected iron directly from said chamber in a molten state.

2. The improvement according to claim 1, and discharging said molten iron into an ingot mold.

3. The improvement according to claim 1, and discharging said molten iron into a steel making furnace.

4. A method of recovering and using iron from iron bearing particulate material in waste gases exhausted from a steel making furnace comprising the steps of: collecting iron bearing particulate material from the waste gases of a steel making furnace, introducing said particulate material into a plasma-arc chamber, establishing a plasma-arc in said chamber, heating said particulate material by said plasma-arc to separate the iron from said particulate material by melting the iron, and discharging said molten iron directly into an operating steel making furnace.

5. The method according to claim 4, and collecting said molten iron in said plasma-arc chamber prior to said discharge thereof.

6. The method according to claim 4, and collecting at least a portion of said iron bearing particulate material from the waste gases of said operating steel making furnace.

7. The method according to claim 4, and providing said plasma-arc chamber with a refractory trough for said melted iron, collecting said melted iron in said trough, and discharging molten iron from said trough directly into said steel making furnace.

References Cited

UNITED STATES PATENTS

| | | | |
|---|---|---|---|
| 3,429,691 | 2/1969 | McLaughlin | 75—10 |
| 3,475,158 | 10/1969 | Neuenschwander | 75—10 |
| 3,347,766 | 10/1967 | Death | 75—10 |
| 3,496,280 | 2/1970 | Dukelow | 75—11 |

L. DEWAYNE RUTLEDGE, Primary Examiner

P. D. ROSENBERG, Assistant Examiner

U.S. Cl. X.R.

75—65